Nov. 5, 1946.        P. PADVA        2,410,550
PHOTOELECTRIC INTEGRATOR
Filed July 20, 1942        2 Sheets-Sheet 2
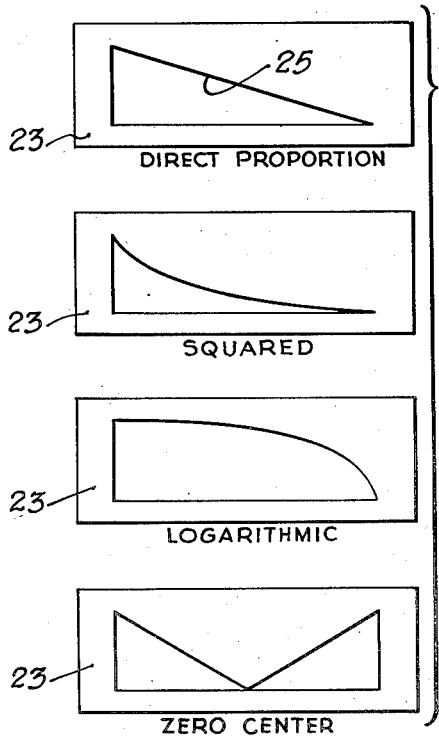
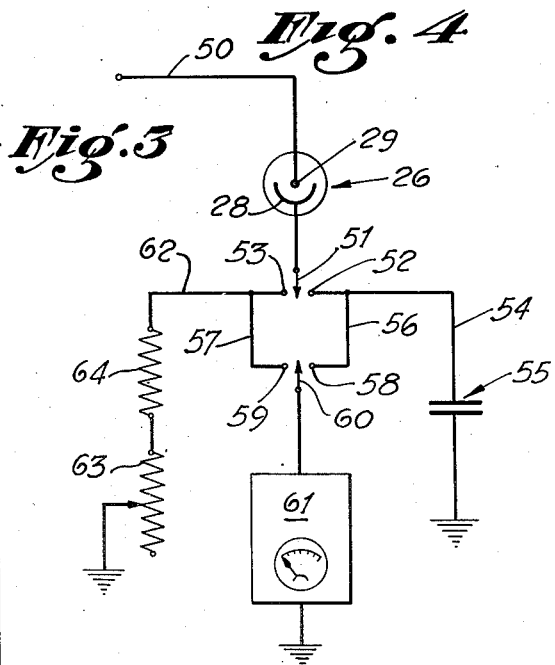
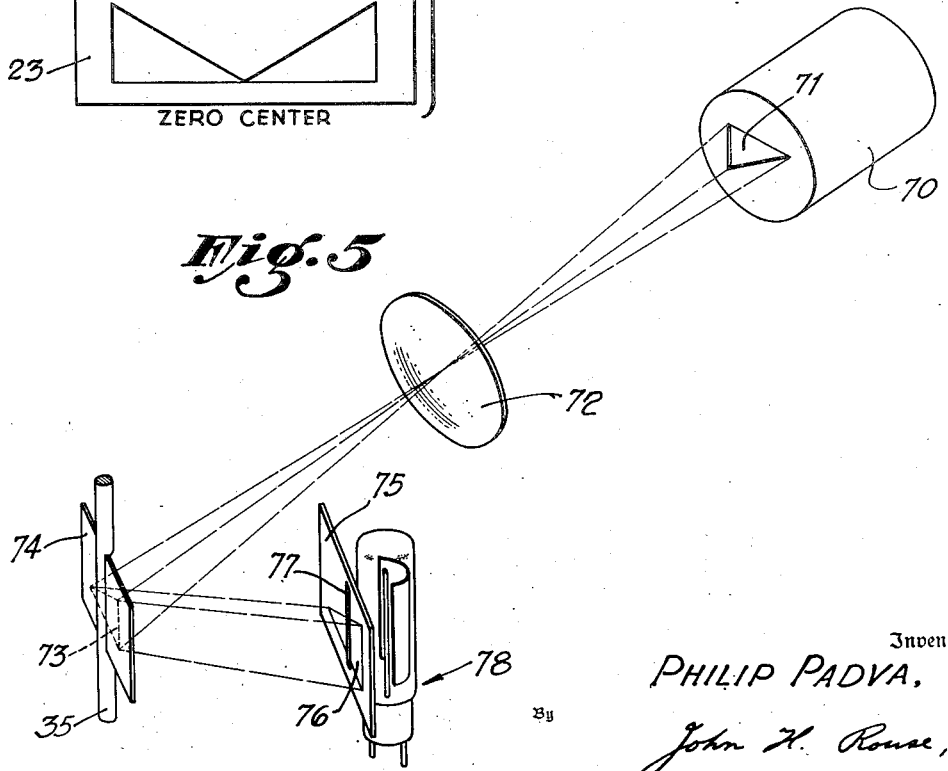
Inventor:
PHILIP PADVA,
John H. Rouse,
Attorney.

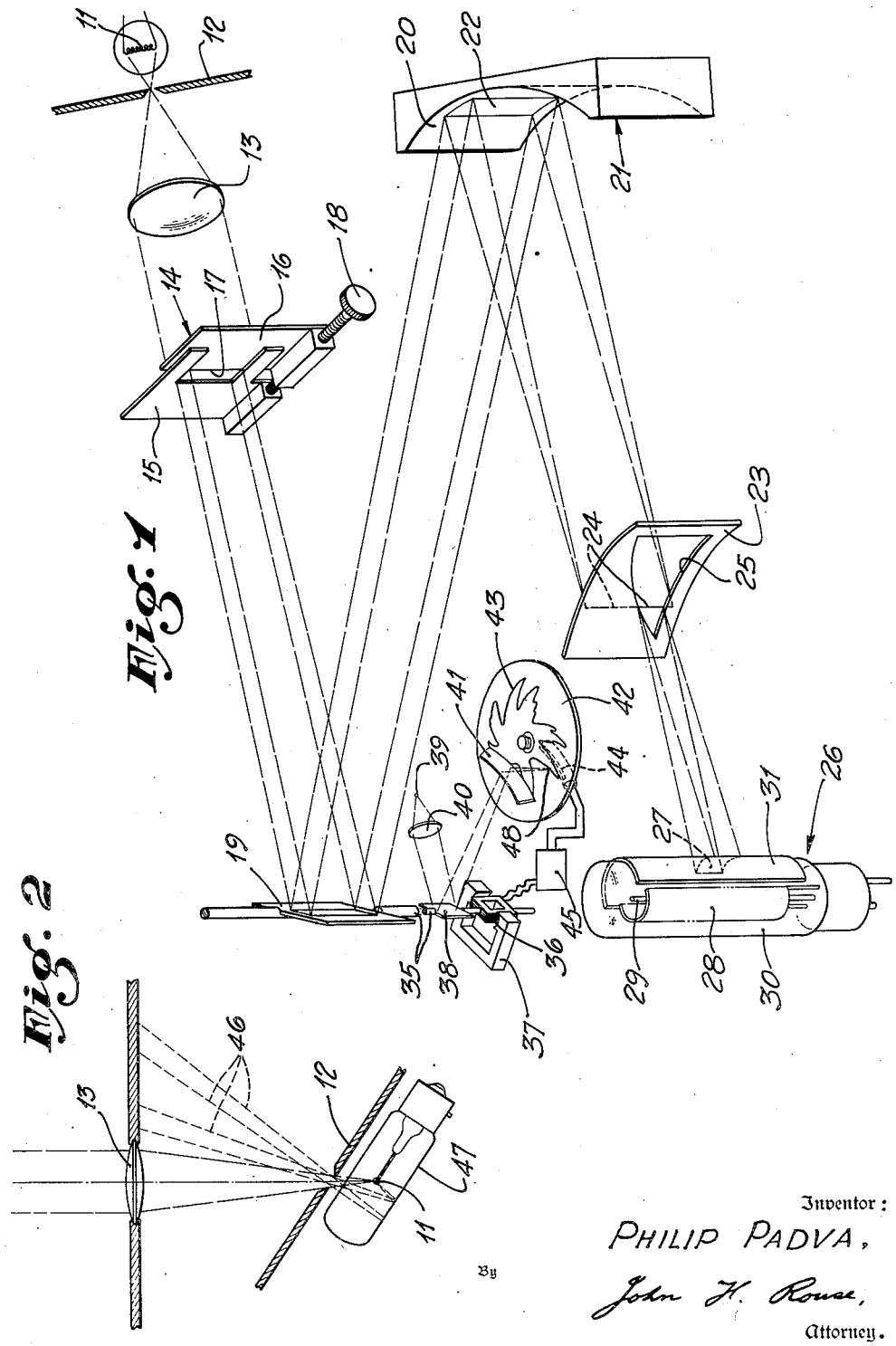

Patented Nov. 5, 1946

2,410,550

UNITED STATES PATENT OFFICE 2,410,550

PHOTOELECTRIC INTEGRATOR

Philip Padva, Los Angeles, Calif., assignor, by mesne assignments, to Thomas J. Neilan, Los Angeles, Calif.

Application July 20, 1942, Serial No. 451,669

13 Claims. (Cl. 88—14)

My present invention relates to integrating apparatus, and has for a main object the provision of a photoelectric integrator wherein the amount of light received by a photocell is varied in accordance with the magnitude of a condition to be integrated, the cumulative effect of the light on the photocell (for example, the charge produced in a condenser by the photocell) indicating the integrated value of the condition.

While not so limited, this invention has particular utility in connection with a photoelectric line tracker of the type disclosed in my U. S. Patent No. 2,277,502, wherein means are provided for "tracking" or following, on a moving chart, a line such as that formed by a recording pen moved in response to changes in a condition, such as flow or pressure; a spot of light, reflected toward the chart by a pivoted mirror, being arranged to remain in partly-obscured relation to the line so that the mirror moves in accordance with the variations of magnitude of the condition represented by the line. In the application of the present invention to such a system, means, including means arranged to move in accordance with the movement of the mirror of the line tracker, are provided for correspondingly varying the amount of light received by a photocell which is connected to charge an electrical condenser; the E. M. F. of the condenser thus being proportional to the integrated value of the "condition" of the moving mirror, and hence to that of the condition represented by the chart line.

Another object of this invention is the provision, in an integrator of the character described, of means whereby the apparatus can readily be modified so as to integrate the value of conditions which are based on various functions, such as direct, logarithmic, or exponential.

Another object is the provision of an integrator, of the character described, whereby the values of a condition can be so integrated as to appear in terms different to that in which the condition was originally expressed; such as the integration, in terms of flow, of values represented in terms of pressure by a line recorded on a chart. An allied object is the provision of means whereby an additional function can be introduced into the integration.

Another object is the provision of means for accurately integrating the values of a condition wherein changes occur relatively rapidly.

Another object is the provision, in a photoelectric integrator, of a mask positioned in the path of a light beam arranged to move with respect thereto in accordance with variations of the magnitude of a condition to be integrated, the mask having an opening therethrough which is so shaped that the amount of light passing through it is a predetermined function of the beam position.

Another object is the provision, in an integrator of the character described in the preceding object, of means for so shaping the beam that it produces a line pattern of light at the mask. An allied object is the provision of a mask having an opening in the form of a slit, and a cooperating light beam pattern of such shape that the length of the slit through which the light passes is a function of the beam position.

Other objects and advantages of the invention will be found in the description, the drawings and the appended claims; and for complete understanding of the invention reference may be had to the following detailed description and accompanying drawings, wherein:

Figure 1 is a schematic view, in perspective, of a photoelectric integrating system embodying my invention;

Figure 2 is a view of a preferred form of light-beam producing means;

Figure 3 illustrates typical forms of light masks employed in integration according to various functions;

Figure 4 is a circuit diagram of means for determining the cumulative effect produced by illumination of the photocell of the integrator; and Figure 5 is a schematic view, in perspective, of a modified form of the system shown in Fig. 1.

Referring first to Fig. 1 of the drawings, the numeral 11 indicates a source of light, such as the incandescent filament of an electric lamp. Light from this source passes, through a circular opening in a wall 12, toward a lens 13 which directs the light, as a beam, onto a masking device 14 comprising a pair of plates 15 and 16 which cooperate to form a rectangular opening 17, the plates being movable with respect to each other, by the operation of a thumb-screw 18, to adjust the width of the opening. The generally rectangular-shaped portion of the beam which passes through the mask 14 impinges upon a plane-surfaced mirror 19, from which it is reflected toward the cylindrical surface 20 of another mirror 21. The generally rectangular pattern of light 22 formed on the mirror surface 20 is redeflected thereby toward another mask 23, the surface 20 being so shaped that the beam converges in width to form, at its focal point on this mask, a line of light 24. The mask 23 has a triangular opening 25 through which a portion of the light line 24 passes toward a photocell 26, the beam now diverging (beyond its focal point at the mask) to again form a generally rectangular light pattern 27 at the photocell.

The axes of the lens 13, mirrors 19 and 21, and photocell 26 are in the plane of the sheet of the drawing, and the mirror 19 and the photocell are on the same vertical axis; the light beam thus projecting constantly angularly downward. The cylindrical surface 20 of mirror 21 is formed on a radius having the axis of mirror 19 (and of the photocell) as a center, the light beam thus "pivoting" at the axis of the photocell. The mask 23 is likewise curved on an arc, the center of the radius of which is at the axis of the photocell, so that the light line 24 is constantly in focus at the mask.

The photocell 26 is of the conventional photoelectric type, comprising a cathode 28 and an anode 29 enclosed within a sealed glass bulb 30. Around a portion of the bulb is a diffusion screen 31, of frosted Celluloid or the like, which serves to distribute light from the pattern 27 to a relatively large area of the cathode so as to minimize the effect of possible non-uniform sensitivity of its surface. The axis (referred to above) of the photocell lies between the cathode and the anode, as shown.

The mirror 19 is mounted on a shaft 35 for rotation, through a limited angle, by means movable in response to variations of the magnitude of a condition to be integrated. By way of example, the means for moving the mirror 19 are here shown as a modified form of the hereinabove-mentioned line tracker disclosed in my Patent No. 2,277,502; the present form being generally more similar to that disclosed in my Patent No. 2,286,641 for Oscillation control means.

In the application of the present invention to the line tracker, the shaft 35 may be an extension of the shaft of that device, which carries a coil 36 rotatable in the field of a magnet 37, and a mirror 38. Light from a source 39 is concentrated by a lens 40 on this mirror, which reflects it horizontally toward a curved mirror 41 from which it is reflected downward onto a rotatable translucent chart 42. The light forms at the chart a very small spot 48 which is arranged to "track" or remain in partly-obscured relation to the opaque chart line 43, as the chart rotates, by photoelectric means comprising a photocell 44 influenced by light passing through the chart and controlling, through an amplifier 45, the movement of coil 36 and hence that of the light spot 48. It will be assumed that the chart line 43 had previously been recorded by a pen moved in response to changes in a condition, such as pressure, flow, or the like, and that when the magnitude of the condition increased the line approached the periphery of the chart.

In Fig. 2 is shown a preferred arrangement of the integrator light-source, wherein the apertured wall 12 is so inclined with respect to the axis of the beam that spurious rays 46, reflected from the glass wall 47 of the lamp, are prevented from reaching the lens 13, so that the light falling on mask 14 is substantially an image of the coils of the filament 11 blended together to form an approximate rectangle; if necessary, a plurality of adjacent filaments being employed to obtain this image.

In Fig. 3, variously-apertured forms of the mask 23 are shown; these masks being of flexible opaque material, so that in use they can readily be bent to the desired curved shape. The mask apertures are so shaped that the length of the light line 24, which passes through the apertures at different positions of its movement with respect to them, is in the proportion, indicated by the legends, to its distance of movement. The particular shape of opening to be employed obviously depends upon the function upon which the variations of magnitude of the condition to be integrated is based. By appropriate change of the normal shape of the opening, corresponding change can, if desired, be introduced into the integration, as was mentioned hereinabove in the objects.

In the electrical circuit of the photocell 26, shown in Fig. 4, the anode 29 is connected by a wire 50 to a source (not shown) of constant-voltage direct current, and the cathode 28 to a switch arm 51 which is selectively engageable with a pair of contacts 52 and 53. The contact 52 is connected by a wire 54 to one plate of a condenser 55, the other plate being connected to ground, as indicated. It will be understood that the negative terminal of the anode voltage source is grounded, and that there is also a ground connection between the other circuit components indicated as grounded. Connected, respectively, to contacts 52 and 53, by wires 56 and 57, is another pair of contacts 58 and 59. Selectively engageable with these contacts is another switch arm 60, which is connected to a vacuum-tube voltmeter 61. If arm 51 is switched to contact 52, a charge accumulates in condenser 55 which is proportional to the illumination of the photocell; the magnitude of which charge can be determined by switching arm 60 to contact 58 (after arm 51 has been returned to its neutral position) and noting the indication on the voltmeter. The left-hand pair of contacts 53 and 59 are connected by a wire 62 to a variable resistance 63, in series with a fixed resistance 64, for a purpose hereinafter to be described.

The operation of the system shown in Fig. 1 will now be described, in connection with the circuit diagram of Fig. 4: To integrate the values represented by the line 43, the chart is rotated at a constant speed, and when it reaches a predetermined position the switch arm 51 is moved to engage contact 52; this operation being accomplished by automatic means which are not herein disclosed. While the mirror 19 moves in accordance with the movement of the line tracker in following the chart line, the light pattern 22 is moved horizontally back and forth across the curved mirror surface 20 so that the position of this pattern corresponds to the radial position of the light spot 48; the line of light 24 reflected from the curved mirror likewise moving back and forth across the mask opening 25 so that the amount of light passing through it to the photocell 26 is constantly varied in accordance with the change of position of the line-tracking spot 48. When the chart has completed exactly one revolution, the aforementioned automatic means returns switch arm 51 to its neutral position and immediately thereafter moves the other switch arm 60 into engagement with contact 58; the degree of charge of the condenser, as now shown on the voltmeter 61, indicating the integrated value of the condition represented by the complete chart line.

The movement of the light line 24 with respect to the mask 23 is readily understood when one considers that the beam projected from the mirror 19 is reflected directly backward toward the axis of mirror 19 from all points of the cylindrical mirror surface 20—but at such an angle from the horizontal that it becomes stationary, or "pivots," at the photocell which, as has been mentioned, is on the same axis as mirror 19. The beam, in its movement across mirror 21, thus moves with respect to mask 23 since the same is spaced from the "pivot" point of the beam on the photocell.

The ends of the mask opening 25 are made to correspond to the positions assumed by the beam when the line-tracking spot 48 is at positions corresponding to zero and to maximum magnitude of the condition represented by the chart line; the height of the opening at its right-hand end (as viewed from the back in Fig. 1) determining the maximum amount of light that can pass to the photocell from the light line 24, which line is of such length that it extends slightly above and below the opening at that position. It will be seen that, if the chart line 43 were in the form of a circle having a radius corresponding to a constant magnitude of, for example, 50% of its predetermined maximum, the light line 24 would remain stationary midway between its extreme positions on the mask during the rotation of the chart, so that light from 50% of the maximum length of the light line would constantly pass to the photocell to correspondingly charge the condenser—assuming that the mask employed is of the "direct proportion" type shown in Fig. 1. Likewise, any deviations of the chart line from such a circular shape would effect corresponding changes in the charging of the condenser, so that (unless the changes were equal and opposite) the integrated value would also change.

While a light pattern different in shape to that of the line 24 could be employed, the "line" shape is preferred since thereby the calculation of masks for integration based on various functions is simplified. The system shown in Fig. 1 is not limited to use with a circular chart, since other types of charts, such as one in the form of a strip, could as well be employed; the integration of a strip chart being controlled according to a predetermined unit of its length.

The primary mask 14 is not an essential element of the system since the required rectangular-shaped light beam could be produced by appropriate masking or dimensioning of the moving mirror 19; however, it is preferred to employ the mask 14, since by adjusting the width of its opening 17 correction for changes occurring with age in the light source or photocell can be effected. To verify the calibration of the system, a chart having a circular line, drawn on a radius corresponding to the predetermined maximum magnitude of the condition to be integrated, is employed. Integration of this line should produce a full-scale reading on the voltmeter; and if it does not, appropriate adjustment of the opening 17 (to permit passage of more or less light) is made. The resistance circuit at the left of the diagram of Fig. 4 provides additional means for verifying the calibration without the necessity of running a complete cycle of integration. After the system has been calibrated by adjustment of the mask opening 17, as described, movement of the chart is stopped and the light spot 48 permitted to remain in contact with the circular line, so that the light line 24 is at the front end of the mask opening 25, as viewed in Fig. 1. Switch arm 51 is then moved into engagement with contact 53 and arm 60 into engagement with contact 59, thereby connecting the voltmeter, shunted by resistances 63 and 64, in circuit with the fully-illuminated photocell. The resistance 63 is then adjusted until full-scale reading of the voltmeter is obtained. The calibration of the system can thereafter be verified by merely bringing the spot 48 to the proper position, as conveniently indicated by a mark printed on each of the charts, and manipulating the switches to connect the shunted voltmeter to the photocell; any variation of the reading from full-scale indicating the need for adjustment of some part, or for recalibration.

In the modified integrating system shown in Fig. 5, the numeral 70 indicates a housing within which is a source of light (not shown) which serves to uniformly illuminate a screen 71 which forms a portion of an end wall of the housing. This screen is of translucent material such as frosted Celluloid or ground glass, and has a shape corresponding to that of the mask opening 25 shown in Fig. 1. By means of a lens 72, an image 73 of the surface field of light provided by the screen 71 is projected onto a pivoted mirror 74, from which it is reflected toward a mask 75 to form thereon another image 76. This mask has a long narrow opening or slit 77 through which the light can pass to a photocell 78. The operation of this system is substantially the same as that shown in Fig. 1; the mirror 74 being mounted, by way of example, on the shaft 35 of the line tracker. Movement of the triangular-shaped light image 76 with respect to the slit 77 permits more or less light to pass therethrough to the photocell in accordance with the movements of the line-tracking light spot 48, so that an integrated charge accumulates in the photocell condenser. Obviously, the light image can be variously shaped for different purposes; for example, so as to correspond to the shapes of the mask openings shown in Fig. 3. An obvious modification of the system of Fig. 5 would be accomplished by mounting the lens 72 for rotation by the shaft 35 (in place of the mirror 74) and so positioning the light source 70 that the image of the light field 71 is directed by the lens toward the mask 75; the light image then being moved back and forth on the mask directly by the movement of the lens.

While I have herein shown and described specific embodiments of my invention, I wish it to be understood that modifications, in addition to those mentioned, may be made without departing from the spirit of the invention, and that I intend therefore to be limited only by the scope of the appended claims.

I claim as my invention:

1. In a photoelectric integrator: means for producing a beam of light, movable light-deflecting means positioned in the path of said beam for moving the beam deflected thereby, means responsive to a condition to be integrated for so moving said deflecting means as to position it and said deflected beam in accordance with the magnitude of said condition, a photocell arranged to receive light from said deflected beam, means whereby the amount of light received by said photocell is varied in accordance with variation of position of said deflected beam, and means electrically connected to said photocell for ascertaining the amount of light received by the photocell during a predetermined interval.

2. In a photoelectric integrator: means for producing a beam of light, movable light-deflecting means positioned in the path of said beam for moving the beam deflected thereby, means responsive to a condition to be integrated for so moving said deflecting means as to position it and said deflected beam in accordance with the magnitude of said condition, a photocell arranged to receive light from said deflected beam, a mask positioned in the path of said deflected beam in advance of the photocell and having an opening so shaped that the amount of light received by the photocell is varied in accordance with variation of position of the deflected beam with respect to said opening, and means electrically connected to said photocell for ascertaining the amount of light received by the photocell during a predetermined interval.

3. In a photoelectric integrator: means for producing a beam of light, movable light-deflecting means positioned in the path of said beam for moving the beam deflected thereby, means responsive to a condition to be integrated for so moving said deflecting means as to position it and said deflected beam in accordance with the magnitude of said condition, a photocell arranged to receive light from said deflected beam, a mask positioned in the path of said deflected beam in advance of the photocell, means whereby said deflected beam forms a line pattern of light at said mask, said mask having an opening so shaped that the length of said line of light passing through said opening is varied in accordance with variation of position of the deflected beam with respect to the opening so that the amount of light received by the photocell is correspondingly varied, and means electrically connected to said photocell for ascertaining the amount of light received by the photocell during a predetermined interval.

4. In a photoelectric integrator: means for producing a beam of light, movable light-deflecting means positioned in the path of said beam for moving the beam deflected thereby, means responsive to a condition to be integrated for so moving said deflecting means as to position it and said deflected beam in accordance with the magnitude of said condition, means for redeflecting said deflected beam, a photocell arranged to receive light from said redeflected beam, a mask positioned in the path of said redeflected beam in advance of said photocell and having an opening, said redeflecting means being so constructed and arranged that said redeflected beam is substantially stationary at the photocell in the movements of said deflected beam but moves with respect to said mask opening, said mask opening being so shaped that the amount of light received by the photocell is varied in accordance with variation of position of said redeflected beam with respect to said mask opening, and means electrically connected to said photocell for ascertaining the amount of light received by the photocell during a predetermined interval.

5. A photoelectric integrator as defined in claim 4 and including means whereby said redeflected beam forms a line pattern of light at said mask, said mask opening being so shaped that the length of said line of light passing through said opening is varied in accordance with variation of position of the redeflected beam with respect to the opening so that the amount of light received by the photocell is correspondingly varied.

6. In a photoelectric integrator: means for producing a beam of light, movable light-deflecting means positioned in the path of said beam for moving the beam deflected thereby, means responsive to a condition to be integrated for so moving said deflecting means as to position it and said deflected beam in accordance with the magnitude of said condition, means for so shaping the beam of light that at least said deflected beam is substantially rectangular in a plane at right-angles to its axis, means for redeflecting said deflected beam, a photocell arranged to receive light from said redeflected beam, a mask positioned in the path of said redeflected beam in advance of said photocell and having an opening, said redeflecting means being so constructed and arranged that said redeflected beam is substantially stationary at the photocell in the movements of said deflected beam but moves with respect to said mask opening, said redeflecting means being further so constructed and arranged that the redeflected beam converges to form a line pattern of light at said mask, said mask opening being so shaped that the length of said line of light passing through said opening is varied in accordance with variation of position of the redeflected beam with respect to the opening so that the amount of light received by the photocell is correspondingly varied, and means electrically connected to said photocell for ascertaining the amount of light received by the photocell during a predetermined interval.

7. A photoelectric integrator, as defined in claim 6, wherein said redeflecting and line-pattern-forming means comprises a mirror having a concave cylindrical reflecting surface.

8. In a photoelectric integrator: means for producing a surface field of light of substantially uniform intensity and having a predetermined contour, a photocell, optical means for reproducing an image of said field at said photocell, means cooperating with said optical means for moving said image with respect to the photocell, the contour of said image being so shaped that the amount of light from the image received by the photocell varies in accordance with the position of the image with respect thereto, means responsive to a condition to be integrated for so actuating said image-moving means that the amount of light received by the photocell corresponds to the magnitude of said condition, and means electrically connected to said photocell for ascertaining the amount of light received by the photocell during a predetermined interval.

9. In a photoelectric integrator: means for producing a surface field of light of substantially uniform intensity and having a predetermined contour, a photocell, optical means for projecting an image of said field toward said photocell, a mask in advance of the photocell and having an opening through which light from said image can pass to the photocell, means cooperating with said optical means for moving said image with respect to said mask, the contour of said image being so shaped that the amount of light passing to the photocell through said mask opening varies in accordance with the position of the image with respect thereto, means responsive to a condition to be integrated for so actuating said image-moving means that the amount of light received by the photocell corresponds to the magnitude of said condition, and means electrically connected to said photocell for ascertaining the amount of light received by the photocell during a predetermined interval.

10. A photoelectric integrator, as defined in claim 9, wherein said mask opening is in the form of a slit, and said light-field-image is so shaped that the length of the slit illuminated by the image is progressively varied in the movement of the image.

11. A photoelectric integrator as defined in claim 1 and including means for so redeflecting said deflected beam that it remains substantially stationary at said photocell.

12. A photoelectric integrator as defined in claim 2 and including means for so redeflecting said deflected beam that it remains substantially stationary at said photocell.

13. A photoelectric integrator as defined in claim 3 and including means for so redeflecting said deflected beam that it remains substantially stationary at said photocell.

PHILIP PADVA.